May 11, 1954 E. C. KARP ET AL 2,678,021
PREPACKAGING SCALE CONSTRUCTION
Filed May 25, 1951 2 Sheets-Sheet 1
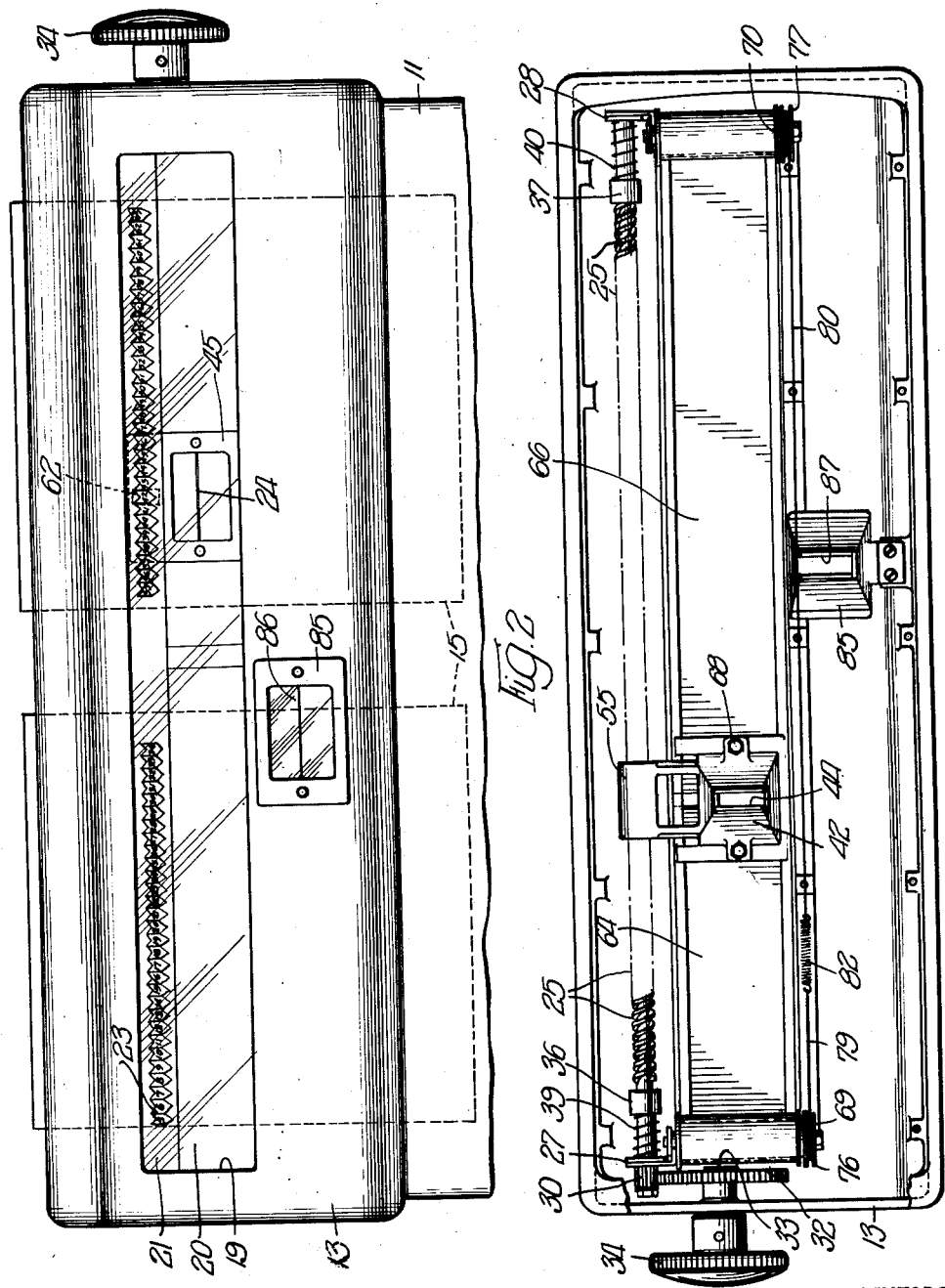
INVENTORS.
Edward C. Karp,
BY Sven G. Berglund,

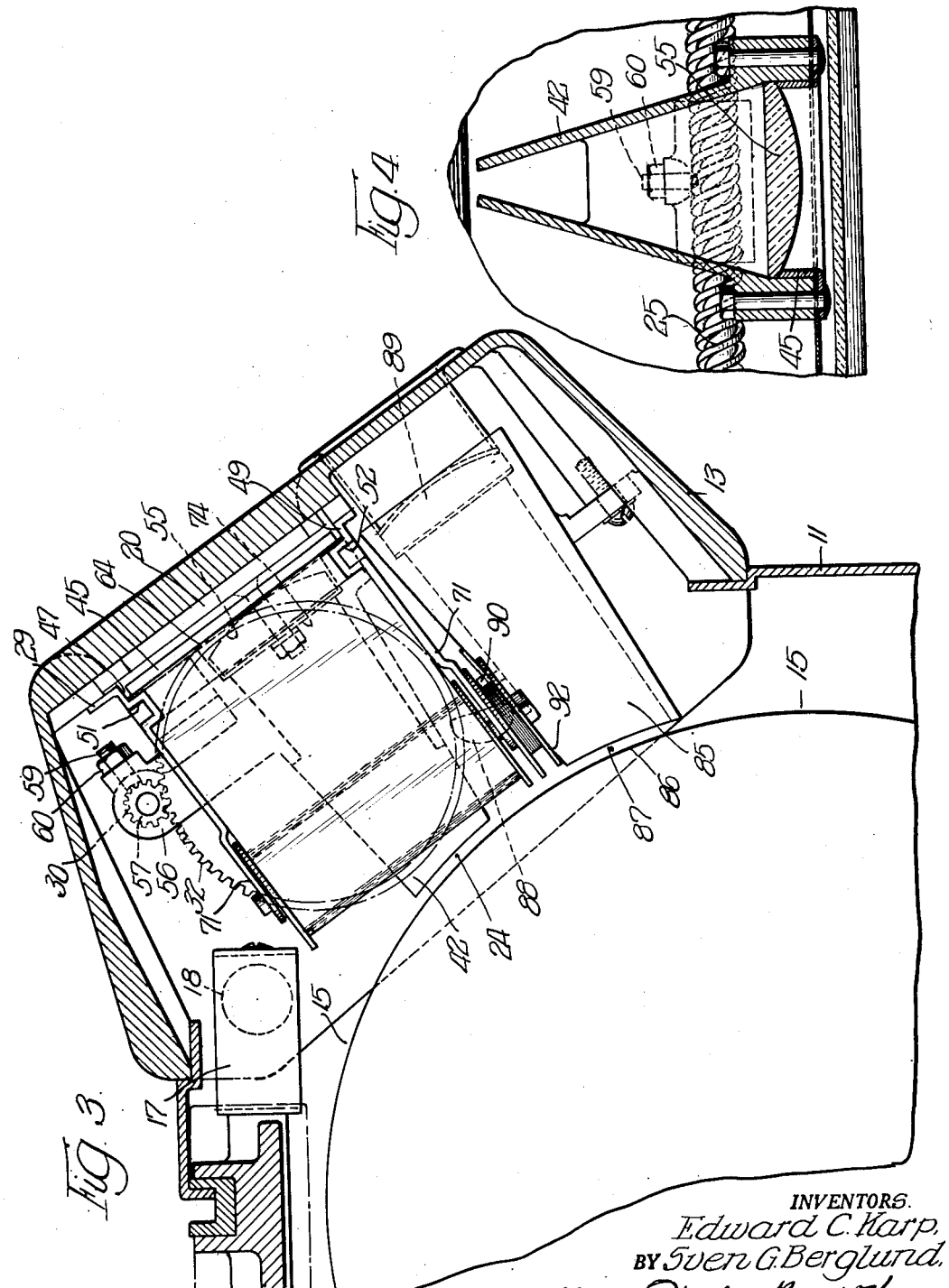

Patented May 11, 1954

2,678,021

UNITED STATES PATENT OFFICE 2,678,021

PREPACKAGING SCALE CONSTRUCTION

Edward C. Karp, Belvidere, and Sven G. Berglund, Rockford, Ill., assignors to Sanitary Scale Company, Belvidere, Ill., a corporation of Illinois Application May 25, 1951, Serial No. 228,250

3 Claims. (Cl. 116—129)

This invention relates to a new and improved scale construction and more particularly to a scale of the type provided wtih means for limiting the view of the scale indicia to those portions directly in use.

The invention is specifically related to the type of scale having a rotating drum bearing a large number of circumferential rows of weight and price indicating indicia. Such scales are provided with elongated sight openings extending parallel to the axis of the drum and with a sight wire or index line extending adjacent the drum behind the elongated sight opening. The price indicating rows indicate the value of the item being weighed at various prices per pound or other unit of weight. A fixed line of indicia is provided with the unit prices showing above each column on the drum and the user of the scale is expected to follow down a column from the unit price indicia to the point where the sight line intersects this selected price column. In order to have a large number of price columns on the drum each column is narrow and there is always the possibility that the user of the scale may not follow down the column correctly and may read an incorrect price from the wrong column. To be sure he is reading correctly the user must take an appreciable period of time to carefully follow down the column and to check that he is reading correctly.

The present invention relates to new and improved means by which the scale user may cover all columns of indicia but that column which he intends to read.

It is an object to provide a construction of this character which completely covers all but a single column of price figures.

It is an additional object to provide such a construction in which the column indicating or unit price indicia is also definitely indicated.

It is a further object to provide a construction in which the weight indicating column is maintained visible in addition to a single price column.

It is another object to provide means by which the figures of the visible column are magnified for easy reading.

It is also an object to provide a construction which is easily adjustable manually to any desired price column.

It is an additional object to provide a device which is simple in design and construction and is adapted for commercial production and use.

Other and further objects will appear as the description proceeds.

While the construction of the invention may be used generally for weighing purposes, it is especially adapted for what is known as a pre-packaging weighing operation. Many types of articles are weighed up and packaged in cartons or in bags before being exposed for sale. In the case of finely divided material it is normally packaged by weight and prices are later applied. There are many types of articles, however, such for example as fruits and vegetables or pre-cut meats which cannot be packaged in exact weights. The person using the scale may weight up successively a large number of packages having a uniform unit price. The present invention is especially adapted for such uses since it need only be adjusted once for such a series of weighing operations and once adjusted it saves time and also insures a reading of the correct price column.

We have shown certain preferred embodiments of our invention in the accompanying drawings in which—

Figure 1 is a fragmentary face view showing the invention applied to a scale;

Figure 2 is a rear view of the pre-packaging assembly;

Figure 3 is a fragmentary cross section, on an enlarged scale, showing the construction; and Figure 4 is a fragmentary section, on an enlarged scale, through the viewing housing assembly.

In the drawings, a scale housing is indicated generally at 11 with the pre-packaging assembly housing 13 mounted thereon. The scale comprises a pair of drums 15 and 16 which are rotated in the usual manner by the material being weighed and which bear columns of figures indicating the value of the material being weighed at different prices per pound. Means for illuminating the scale drums may comprise a tubular light bulb indicated at 18 as carried by brackets 17, shown in Figure 3.

The pre-packaging assembly housing 13 is provided with an elongated sight window 19 closed by glass plate 20. Either directly on the plate or mounted immediately adjacent the plate is an elongated space 21 containing a plurality of indicia 23 which normally are figures indicating the price per unit of weight, as for example, per pound. This line of indicia is translucent so that the figures may be read by a light shining through them from the internal source of illumination. The sight line or index wire 24 is shown between the drum 15 and the inner end of housing 42.

The housing 13 carries internally thereof the spiral drive shaft 25 mounted on brackets 27 and 28 which extend from member 29 which has an opening aligned with opening 19 in the housing 13. This shaft 25 carries a small pinion 30 which meshes with a gear 32 carried on a stub shaft 33 mounted in one end of the housing 13. The stub shaft carries a knob 34 by means of which it may be manually rotated. The spiral drive shaft 25 has loosely fitted thereon a pair of sleeves 36 and 37 which are backed up by springs 39 and 40. This construction provides a cushioning stop for the movable parts at the ends of this travel. A movable price sight housing 42 is provided. This housing tapers inwardly to a small elongated opening 44 of a size to expose only a single column of figures on the drums 15. It will be understood that the columns of figures on the drums are located immediately below the various indicia 23 and are of approximately the same width as these indicia. The sight housing 42 has a front cover plate 45 secured thereto. The upper and lower edges of the plate 45 pass within elongated recesses 47 and 49 formed between the re-entrant portions 51 and 52 of the member 29 and the glass plate 20. The housing body 42 has upwardly and downwardly extending flanges 53 and 54, respectively, which are located behind the re-entrant portions 51 and 52. As shown in Figures 3 and 4, the housing 42 carries a lens 55 which is held in place by flanges on the front plate 45. The sight housing 42 is provided with an upwardly extending bracket 56 which has a cylindrical bore 57 formed therein of a size to fit over the spiral drive member 25. An adjustable screw 59 having a pointed inner end is threaded into the bracket 55 and held in adjusted position by lock nut 60, as shown in Figures 3 and 4. The pointed end of this screw 59 fits in the spiral groove of the spiral drive member 25 so that rotation of that member gives linear movement to the sight housing 42.

The front plate 45 of the sight housing has a small rectangular opening 62 formed in its upper portion, as shown in Figure 1. This sight opening is so located as to be behind the row of price indicia 23 and is of a size to expose only one of said indicia at a time.

A pair of opaque curtains 64 and 66 are provided, these curtains having their adjacent ends connected to the sight housing 42 by being clamped between the housing 42 and the front plate 45 by means of bolts 68 which also hold the front plate in position on the housing. These curtains 64 and 66 are of a vertical width to completely cover the area of the sight glass 20 with the edges of the curtains in the recesses formed between members 51 and 53 and the glass 20, as shown in Figure 3. The opposite ends of the curtains 64 and 66 are secured to the rollers 69 and 70 which are supported by suitable brackets 71 extending from member 29 at the opposite ends of the sight glass 20. Each of these curtains 64 and 66 is of a length to cover substantially the entire sight glass 20 so that with the sight housing 42 at either end of its limits of travel the drums of the scale are completely hidden by the curtains, the only portion visible being that seen through the sight housing 42.

The spools 69 and 69 have small sheaves 76 and 77 at their lower ends, these sheaves rotating with the spools. Wires 79 and 80 are connected to the sheaves, respectively, and are of such length that a substantial amount of wire is wound on the sheave. The free ends of these wires 79 and 80 are connected by tension spring 82.

A fixed sight housing 85 is provided located below the elongated sight glass 20. This housing is also provided with a narrow inner sight opening 87 which shows only one column of figures on the adjacent scale drum. This sight opening may be provided with a suitable enlarged lens 89 shown in broken lines on Figure 3. This fixed sight opening is located opposite a circumferential column of figures on the drum which indicate actual weights and not prices. A separate sight line 86 is provided. This sight housing 85 is provided on its upper face with a small reflector 88 secured in place by machine screw 90. The inner end of the upper wall of the housing 85 in front of the reflector 88 is cut away at 92 to permit light from the reflector to shine on the weight scale on the drum 15 and on the sight line 86.

In the operation of the device, when it is desired to weigh out material at a selected price per pound, the knob 34 is manually rotated to move the sight housing 42 by means of the spiral drive member 25 which is rotated by means of gear 32 and pinion 30. The front plate 45 of this housing 42 is clearly visible to the user through glass 20. It is moved in the proper direction and the proper distance until the opening 62 causes the selected price indication 23 to be illuminated. Only this price indicia will be illuminated since all others are covered either by the opaque curtain 64 or 66 or by the frame 45.

During the movement of the housing 42, one of the curtain 64 and 66 will roll up on its spool while the other curtain will be unrolled from its spool. The unrolling action takes place due to the tension applied to the curtain by the movement of the housing 42. The opposite curtain will be rolled up on the spool since that spool will be caused to rotate in exact unison with the spool from which the opposite curtain is being unrolled. This movement of the spool which is winding up the curtain is caused by the wires 79 and 80 and the tension spring 82. With the sight housing 42 and its associated parts correctly adjusted there is no possibility of the user of the scale looking at a wrong column of figures for the price of the material being delivered.

It will be understood that the sight housing 85 is fixed in place always opposite the weight scale on the drum so that regardless of the location of the housing 42, the user of the scale may always readily read the exact weight of the material being weighed. It is to be noted that the sight housings 42 and 85 are so formed and located and their lenses 55 and 89 so designed that the user may see both price and weight indications with the head held at the same level.

While certain preferred embodiments of our invention have been shown they are to be understood to be illustrative only. The construction is capable of variation to meet differing conditions and requirements and we contemplate such modifications as come within the spirit and scope of the appended claims.

In the claims:

1. In combination with a scale having a rotatable drum with a plurality of parallel circumferentially extending rows of indicia thereon, a main housing having an elongated sight opening extending axially of the drum, a longitudinally extending row of unit price indicia visible through the sight opening and aligned with corresponding rows of indicia on the drum, said row of price indicia being translucent, a sight housing movable longitudinally of the sight opening, said housing having an opening exposing a single row of drum indicia and covering adjacent rows, illuminating means within the main housing for illuminating the drum and transmitting light through the translucent unit price indicia, the sight housing having a second opening therein for exposing the unit price indicia corresponding to the row of drum indicia exposed thereby and covering adjacent unit price indicia.

2. In combination with a scale having a rotatable drum with a plurality of parallel circumferentially extending rows of indicia thereon, a main housing having an elongated sight opening extending axially of the drum, a longitudinally extending row of unit price indicia visible through the sight opening and aligned with corresponding rows of indicia on the drum, said rows of price indicia being translucent, a sight housing movable longitudinally of the sight opening, said housing having an opening exposing a single row of drum indicia and covering adjacent rows, illuminating means within the main housing for illuminating the drum and transmitting light through the translucent unit price indicia, the sight housing having a second opening therein for exposing the unit price indicia corresponding to the row of drum indicia exposed thereby and covering adjacent unit price indicia, rollers within the main housing adjacent the ends of the sight opening, opaque curtains connected to the sight housing and extending around the rollers, said curtains covering both unit price and drum indicia not covered by the sight housing and means for moving the sight housing longitudinally of the sight opening.

3. In combination with a scale having a rotatable drum with a plurality of parallel circumferentially extending rows of price indicia thereon, a row of weight indicia thereon, a sight housing movable opposite a selected row of price indicia, and a weight sight housing fixedly secured opposite the rows of weight indicia, said two housings being located upon spaced planes radial of the drum, and lenses carried by the housings, the lenses being designed and mounted whereby the indicia behind the lenses may be viewed from a single plane axial of the drum.

References Cited in the file of this patent

UNITED STATES PATENTS

| Number | Name | Date |
|---|---|---|
| 1,487,514 | Goss | Mar. 18, 1924 |
| 1,786,788 | Stimpson | Dec. 30, 1930 |
| 1,918,877 | Templeton | July 18, 1933 |
| 1,978,910 | Ogsbury | Oct. 30, 1934 |
| 1,996,978 | Schmalholz | Apr. 9, 1935 |